(12) United States Patent
Elembaby

(10) Patent No.: US 12,127,903 B2
(45) Date of Patent: *Oct. 29, 2024

(54) DENTAL FACE SHIELD SYSTEM AND METHOD OF MAKING

(71) Applicant: Imam Abdulrahman Bin Faisal University, Dammam (SA)

(72) Inventor: Abeer ElSayed Elembaby, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,393

(22) Filed: Jun. 11, 2024

(65) Prior Publication Data

US 2024/0325113 A1 Oct. 3, 2024

Related U.S. Application Data

(63) Continuation of application No. 18/298,025, filed on Apr. 10, 2023, now Pat. No. 12,023,215, which is a
(Continued)

(51) Int. Cl.
*A61C 5/82* (2017.01)
*A41D 13/11* (2006.01)

(52) U.S. Cl.
CPC ............ *A61C 5/82* (2017.02); *A41D 13/1107* (2013.01)

(58) Field of Classification Search
CPC ...... A61C 5/82; A41D 13/11; A41D 13/1107; A41D 13/1184
(Continued)

(56) References Cited

U.S. PATENT DOCUMENTS 4,261,697 A * 4/1981 Newitter ................. A61C 5/82
433/137
4,344,758 A * 8/1982 Wielhouwer ............ A61C 5/90
433/136
(Continued)

FOREIGN PATENT DOCUMENTS

CN 208030340 U 11/2018

OTHER PUBLICATIONS

Alpha Pro Tech ; Critical Cover Coverall Full & Half Face Shields ; Jan. 15, 2021 ; 2 Pages.

*Primary Examiner* — Matthew M Nelson
(74) *Attorney, Agent, or Firm* — Oblon, McClelland, Maier & Neustadt, L.L.P.

(57) ABSTRACT

The present disclosure provides a dental procedure safety device including a face mask and a face shield attached to each other to form a modified face mask shield device, where the face shield overlaps in front of the face mask. The device further includes a dental dam frame including a plurality of nibs projecting outwardly from an outer perimeter of the dental dam frame for attachment of a dental dam membrane, such that a portion of the dental dam membrane is attached over an upper horizontal member of the dental dam frame. An attachment device, positioned over the portion of the dental dam membrane attached over the upper horizontal member, detachably connects to a rear surface of a lower end of the face mask, such that the modified face mask shield device is positioned in front of the attachment device.

16 Claims, 10 Drawing Sheets

Related U.S. Application Data continuation of application No. 17/225,253, filed on Apr. 8, 2021, now Pat. No. 11,660,165.

(58) Field of Classification Search
USPC .......................................................... 433/137
See application file for complete search history.

(56) References Cited

U.S. PATENT DOCUMENTS

| | | | | |
|---|---|---|---|---|
| 4,721,465 | A * | 1/1988 | Barasz | A61C 5/82 433/137 |
| 4,889,490 | A * | 12/1989 | Jenkinson | A61C 5/82 433/136 |
| 4,969,473 | A * | 11/1990 | Bothwell | A41D 13/1153 433/136 |
| 5,226,815 | A * | 7/1993 | Bowman | A61B 46/00 128/853 |
| 5,499,917 | A * | 3/1996 | Erickson | A61C 5/82 433/137 |
| 6,079,980 | A * | 6/2000 | Durand | A61C 5/90 128/206.13 |
| 6,135,770 | A * | 10/2000 | Bembenek | A61C 5/82 433/136 |
| 6,185,740 | B1 * | 2/2001 | Zegarelli | A61F 9/045 128/857 |
| 6,532,598 | B1 * | 3/2003 | Cardarelli | A61F 9/029 2/173 |
| RE38,722 | E * | 4/2005 | Jensen | A61C 5/82 433/136 |
| 8,684,728 | B1 * | 4/2014 | Wiesemann | A61C 7/146 433/3 |
| 10,631,585 | B2 * | 4/2020 | Ahoubim | A41D 13/1115 |
| 11,553,742 | B2 * | 1/2023 | Eldibany | A62B 18/086 |
| 11,660,165 | B2 * | 5/2023 | Elembaby | A41D 13/1107 433/137 |
| 2003/0028946 | A1 * | 2/2003 | Zegarelli | A61B 46/00 128/857 |
| 2004/0126739 | A1 * | 7/2004 | Heasley | A61C 5/82 433/136 |
| 2004/0209224 | A1 * | 10/2004 | Heasley | A61C 5/82 433/139 |
| 2021/0113804 | A1 * | 4/2021 | Pelachyk | A61M 5/1452 |
| 2021/0186657 | A1 * | 6/2021 | Abdalla Sabeal Mohamed Al Bloushi | A61C 5/82 |
| 2021/0338377 | A1 * | 11/2021 | Ferone | A61C 17/08 |
| 2021/0369433 | A1 * | 12/2021 | Gonsky | A61B 90/05 |
| 2022/0323179 | A1 * | 10/2022 | Elembaby | A41D 13/1184 |

* cited by examiner

DENTAL FACE SHIELD SYSTEM AND METHOD OF MAKING

CROSS-REFERENCE TO RELATED APPLICATIONS

The present application is a Continuation of U.S. application Ser. No. 18/298,025, now allowed, having a filing date of Apr. 10, 2023, which is a Continuation of U.S. application Ser. No. 17/225,253, now U.S. Pat. No. 11,660,165, having a filing date of Apr. 8, 2021.

BACKGROUND

Field of the Invention

The present disclosure relates to a safety device and, more particularly relates to a dental procedure safety device and a method of assembling/manufacturing the dental procedure safety device.

Discussion of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With an increase in probable ways of transmission of airborne virus, bacteria, or pathogen, there has been an increase in need to prevent such transmission. Particularly, in unavoidable scenarios, such as during dental treatment, ensuring the safety of a patient and members of a dental team becomes important. For example, during a dental treatment, a probability of transmission of airborne viruses may be high due to direct contact with a patient's mouth. Conventional devices known to address safety measures of the patient are complex to use and are not economical. As such, there exists a need to provide a device which is simple in construction and use to address the safety measures for the patient.

SUMMARY

According to one aspect of the present disclosure, a dental procedure safety device is disclosed. The dental procedure safety device includes a face mask and a face shield attached to the face mask to form a modified face mask shield device, where the face shield overlaps in front of the face mask. The dental procedure safety device further includes a dental dam frame having an upper horizontal member, a lower horizontal member, and two vertical side leg members. The dental procedure safety device further includes a plurality of attachment nibs projecting outwardly from an outer perimeter of the dental dam frame for attachment of a dental dam membrane. In such arrangement, a portion of the dental dam membrane is at least attached over the upper horizontal member of the dental dam frame. The dental procedure safety device also includes an attachment device positioned at least over the portion of the dental dam membrane attached over the upper horizontal member. The attachment device is configured to detachably connect to a rear surface of a lower end of the face mask, such that the modified face mask shield device is positioned in front of the attachment device.

In some embodiments, the attachment device includes an adhesive device.

In some embodiments, the adhesive device is a double-sided tape with an adhesive material positioned on a front surface and a back surface of the adhesive device.

In some embodiments, the dental dam membrane includes a rubber dam membrane.

In some embodiments, the modified face mask shield device includes a pair of ear loops positioned on opposite vertical ends of the face mask.

In some embodiments, the pair of ear loops are located above the attachment device and the pair of ear loops are configured to avoid interference with the portion of the dental dam membrane attached over the upper horizontal member when the attachment device is detachably connected to the rear surface of the lower end of the face mask.

In some embodiments, the face mask of the modified face mask shield device extends from a middle portion of a patient's nose till an upper border of the patient's lips.

In some embodiments, a rear surface of a lower end of the face mask includes another attachment device.

In some embodiments, the attachment device is configured to detachably connect to the another attachment device, and the modified face mask shield device is positioned in front of the attachment device.

According to another aspect of the present disclosure, a dental procedure safety device is disclosed. The dental procedure safety device includes a face mask and a face shield attached to the face mask to form a modified face mask shield device. The face shield overlaps in front of the face mask and a rear surface of a lower end of the face mask includes an attachment device. The dental procedure safety device further includes a dental dam frame having an upper horizontal member, a lower horizontal member, and two vertical side leg members. The dental procedure safety device further includes a plurality of attachment nibs projecting outwardly from an outer perimeter of the dental dam frame for attachment of a dental dam membrane. The dental dam membrane is at least attached over the upper horizontal member. The dental dam membrane attached over the upper horizontal member is configured to detachably connect to the attachment device of the modified face mask shield device.

According to yet another aspect of the present disclosure, a method of manufacturing a dental procedure safety device is disclosed. The method includes attaching a face mask and a face shield to each other to form a modified face mask shield device, such that the face shield overlaps in front of the face mask. The method further includes attaching a dental dam membrane to a plurality of attachment nibs projecting outwardly from an outer perimeter of a dental dam frame. The dental dam frame includes an upper horizontal member, a lower horizontal member, and two vertical side leg members, where a portion of the dental dam membrane is at least attached over the upper horizontal member of the dental dam frame. The method further includes positioning an attachment device at least over the portion of the dental dam membrane attached over the upper horizontal member. The method also includes detachably connecting the attachment device to a rear surface of a lower end of the face mask, such that the modified face mask shield device is positioned in front of the attachment device.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
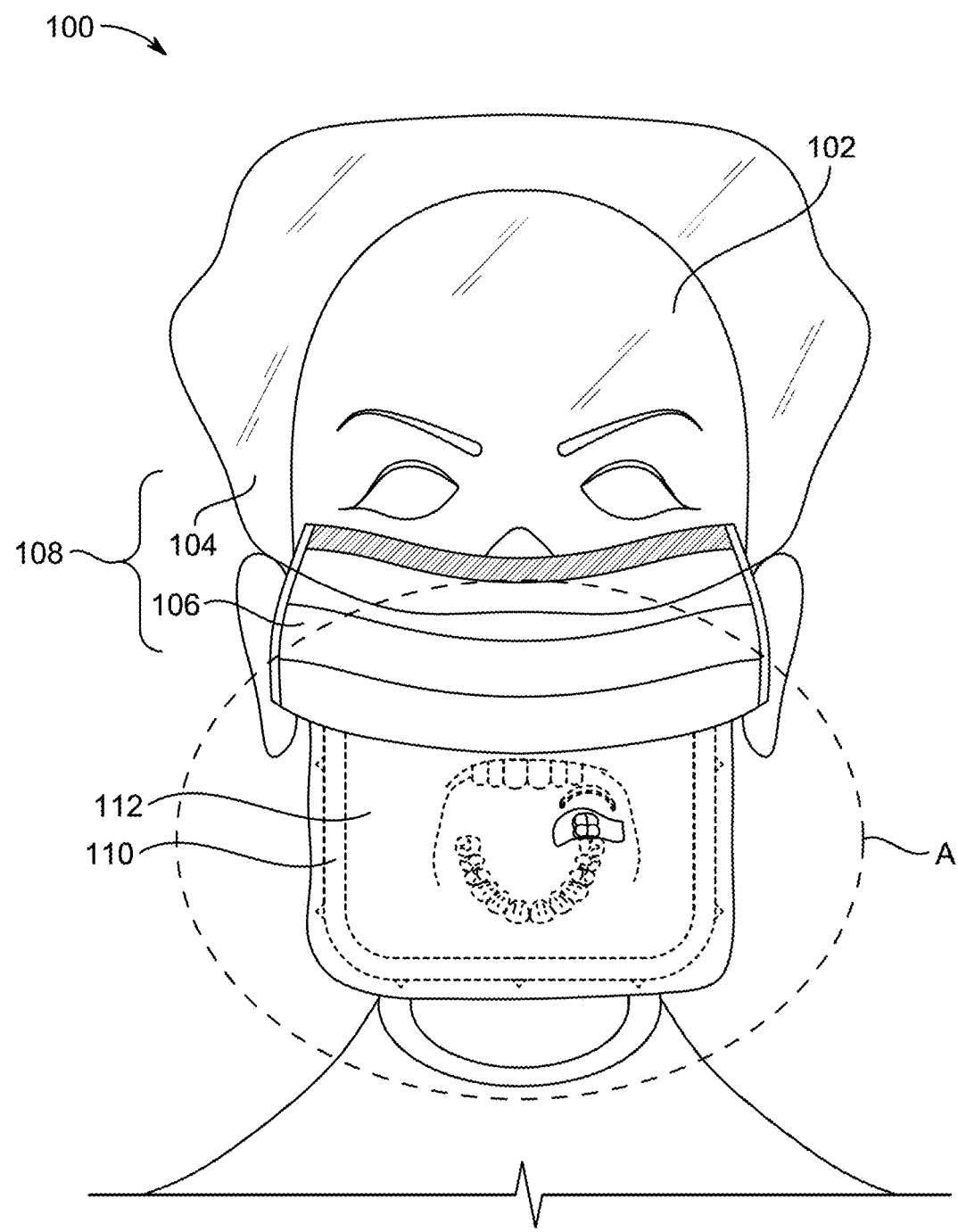
FIG. 1 shows a dental procedure safety device applied to a patient, according to an embodiment of the present disclosure.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a dental procedure safety device that enhances protection against transmission of virus, such as, for example Covid19 virus, during a dental procedure, particularly when an operating team, medical team or dental hygiene person or persons is in direct contact or located at a short distance with respect to a patient undergoing dental treatment.

Referring to FIG. 1, a dental procedure safety device 100 applied to a patient 102 is illustrated. Particularly, the dental procedure safety device 100, hereinafter referred to as "the device 100", is applied to a face of the patient 102. The device 100 includes a face shield 104 and a face mask 106 attached to the face shield 104 to form a modified face mask shield device 108 configured to cover an upper portion of the face. Specifically, the modified face mask shield device 108 extends from the upper lip to a region beyond the forehead. In an embodiment, the face shield 104 is attached to the face mask 106 in a manner such that a lower portion of the face shield 104 overlaps in front of a top portion of the face mask 106. The device 100 further includes a dental dam frame 110 extending from a bottom portion of the modified face mask shield device 108. The device 100 also includes a dental dam membrane 112 disposed on the dental dam frame 110 and configured to cover a lower portion of the face. As such, the device 100 covers the face completely and may prevent transmission of virus to and from the patient 102.

Figure 2:
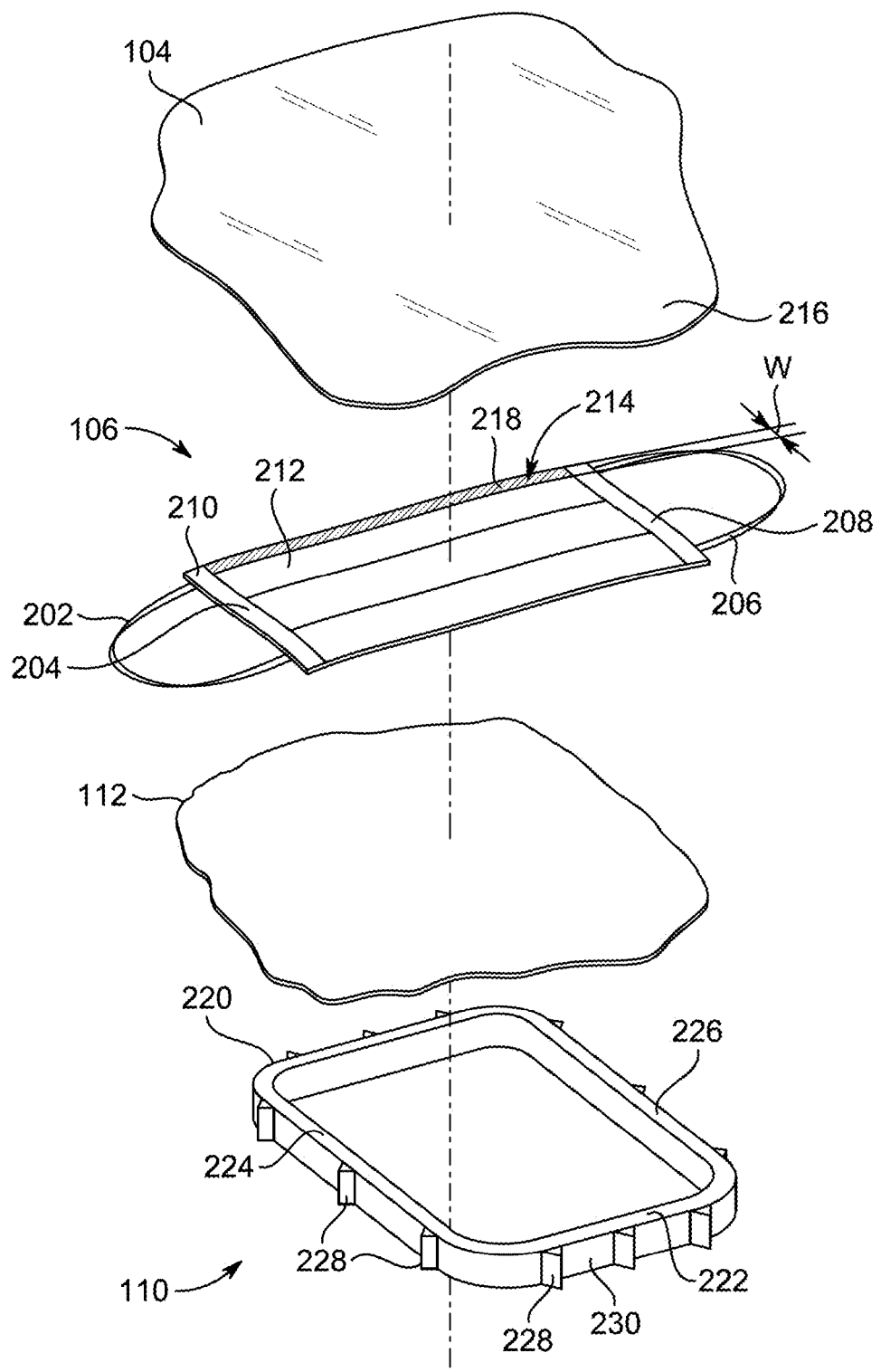
FIG. 2 shows a detached view of individual components included in the dental procedure safety device of FIG. 1, according to an embodiment of the present disclosure.

FIG. 2 shows individual components of the device 100 detached from the device 100 and will be described in conjunction with FIG. 1. The individual components of the device 100 include the face shield 104, the face mask 106, the dental dam frame 110, and the dental dam membrane 112, although other components may also be included. In the illustrated embodiment, the face shield 104 is embodied as a transparent sheet, such a soft flexible plastic sheet, known in the art. The face shield 104 covers the eyes and the forehead of the patient 102. The face mask 106 extends between the nose and an upper border of the upper lip of the patient 102, thereby preventing transmission of any particles or virus through the nose. In some examples, the face mask 106 may a cloth mask or a surgical mask. In some examples, the face mask 106 may include multiple layers of protection to add to the safety of the device 100. The modified face mask shield 108 includes a pair of ear loops positioned on opposite vertical ends of the face mask. For example, a first ear loop 202 is provided on a first side 204 of the face mask 106 and a second ear loop 206 is provided on a second side 208 of the face mask 106. The pair of ear loops help secure the face mask 106 at desired position of the face. When the modified face mask shield 108 is used to cover the face, the face shield 104 flexibly bends in an arcuate manner along the upper portion of the face, thereby covering portions on either side of the forehead.

As mentioned earlier, the face shield 104 is attached to the face mask 106. In an embodiment, a top end portion 210 of a front surface 212 of the face mask 106 may include a first attachment device 214 configured to detachably attach with a rear surface of a bottom end portion 216 of the face shield 104. As such, in the modified face mask field device 108, the bottom end portion 216 of the face shield 104 overlaps on the top end portion 210 of the front surface 212 of the face mask 106. Such arrangement of the face shield 104 and the face mask 106 ensures a soft material of the face mask 106 to cover the nose and eliminates any discomfort the bottom end portion 216 of the face shield 104 may otherwise cause over the nose. In an embodiment, the first attachment device 214 may include an adhesive device 218. In some embodiments, the adhesive device 218 may be a double-sided tape with an adhesive material positioned on a front surface and a back surface of the adhesive device 218. In some embodiments, a width 'W' of the adhesive device 218 may be predetermined to rigidly secure the face shield 104. In some embodiments, the adhesive device 218 may extend all along the top end portion 210 of the face mask 106. In some embodiments, the adhesive device 218, such as the double-sided tape, may be provided in pieces along the top end portion 210 of the face mask 106. An adhesive layer of the adhesive device 218 may be covered by a strip (not shown) to protect the adhesive layer, such that the strip may be easily peeled off by a user, for example the operating team. Such detachable connection between the face shield 104 and the face mask 106 allows replacement of the face mask 106 for another patient.

Further, the dental dam frame 110 includes an upper horizontal member 220, a lower horizontal member 222, and two vertical side leg members, such as a first side leg member 224 and a second side leg member 226, extending between the upper horizontal member 220 and the lower horizontal member 222. As such, the dental dam frame 110 is embodied as a substantially rectangular component. In some embodiments, a bottom portion of the dental dam frame 110 may be accurately shaped to conform with an arcuate portion of the face. The device 100 further includes a plurality of attachment nibs 228 projecting outwardly from an outer perimeter 230 of the dental dam frame 110. In an embodiment, each attachment nib 228 may be located equidistant from an adjacent attachment nib 228. In some embodiments, the dental dam frame 110, including the attachment nibs 228, may be 3D printed using materials, such as, but not limited to, plastic and metal powder. In an example, the dental dam frame 110 may be made of rubber.

The dental dam membrane 112 is attached to the dental dam frame 110 with the aid of the attachment nibs 228. In an embodiment, the dental dam membrane 112 may be embodied as a rubber dam membrane. In some embodiments, the dental dam membrane 112 may be a flexible membrane made of polytetrafluoroethylene or any sterile expandable material known to a person skilled in the art. Owing to the flexibility, the dental dam membrane 112 may be stretched and secured on the dental dam frame 110 by the attachment nibs 228. Preferably, a portion of the dental dam membrane 112 is at least attached over the upper horizontal member 220 of the dental dam frame 110.

Figure 3A:
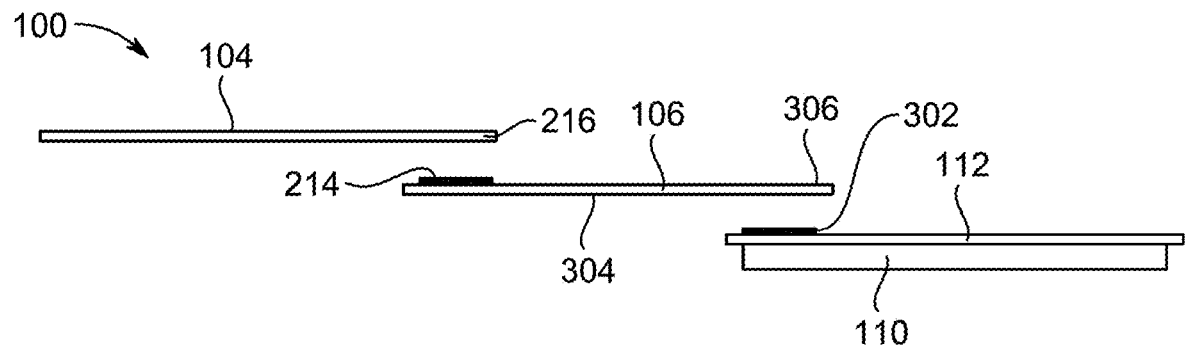
FIGS. 3A-3F show cross-sectional views of the dental procedure safety device, according to various embodiment of the present disclosure.

FIGS. 3A to 3F shows cross-sectional views of the device 100, according to various embodiment of the present disclosure. Particularly, FIGS. 3A to 3F illustrate schematic representation of components of the device 100 in cross-sectional views. Referring to FIG. 3A, the device 100 also includes an attachment device (hereinafter referred to as "the second attachment device 302") positioned at least over the portion of the dental dam membrane 112 attached over the upper horizontal member 220 of the dental dam frame 110. The second attachment device 302 is configured to detachably connect to a rear surface 304 of a lower end 306 of the face mask 106, such that the modified face mask shield device 108 is positioned in front of the second attachment device 302. In some embodiments, the second attachment device 302 may include an adhesive device, such as a double-sided tape or a sticky tape.

In an embodiment, the pair of ear loops 202, 206 may be located above the second attachment device 302 and may be configured to avoid interference with the portion of the dental dam membrane 112 attached over the upper horizontal member 220 of the dental dam frame 110 when the second attachment device 302 is detachably connected to the rear surface 304 of the lower end 306 of the face mask 106.

Figure 3B:
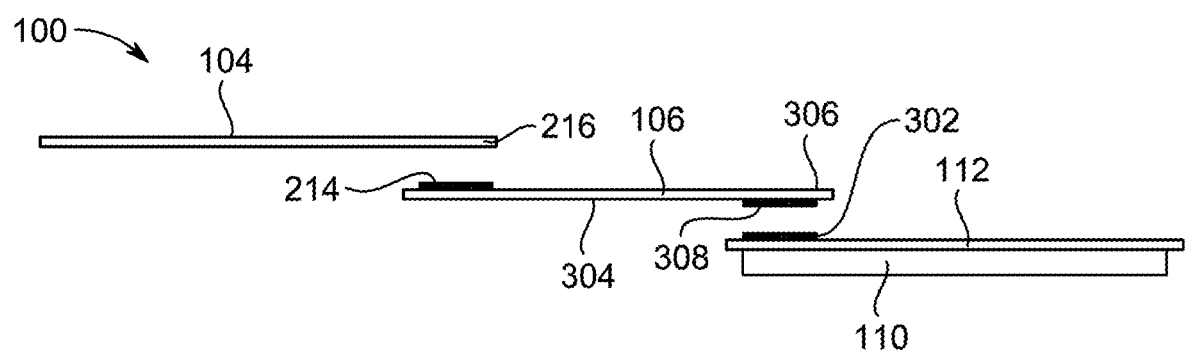

Referring to FIG. 3B, in an embodiment, the rear surface 304 of the lower end 306 of the face mask 106 may include another attachment device (referred to as "the third attachment device 308"), to detachably connect with the second attachment device 302 located on the portion of the dental dam membrane 112 attached over the upper horizontal member 220 of the dental dam frame 110, such that the modified face mask shield device 108 is positioned in front of the second attachment device 302. The embodiments illustrated in FIG. 3A and FIG. 3B achieves complete attachment of the parts of the device 100, thereby eliminating any gap between the parts. Therefore, such configuration of the device 100 eliminates possibility of transmission of virus to the patient 102 while also concealing the attachment devices and improving aesthetics of the device 100.

Figure 3C:
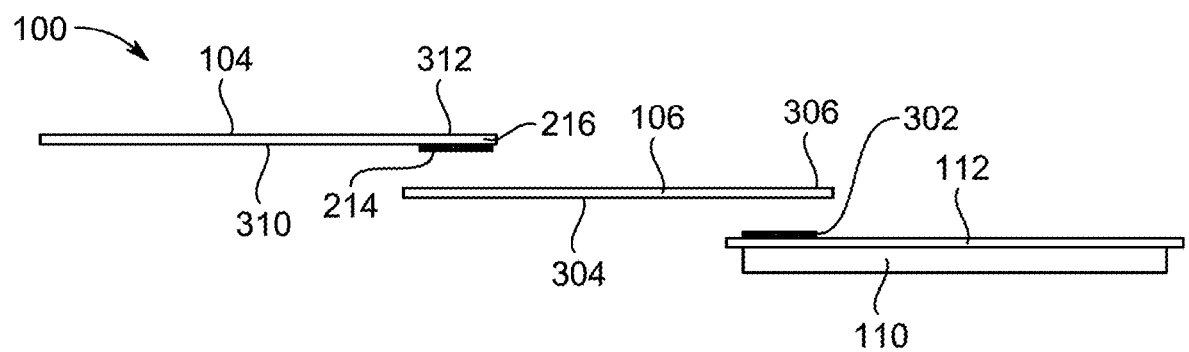

Referring to FIG. 3C, in an embodiment, the first attachment device 214 may be provided at a rear surface 310 of a lower end 312 of the face shield 104 instead of providing at the top end portion 210 of the front surface 212 of the face mask 106. As such, the face mask 106 may be free from attachment devices.

Figure 3D:
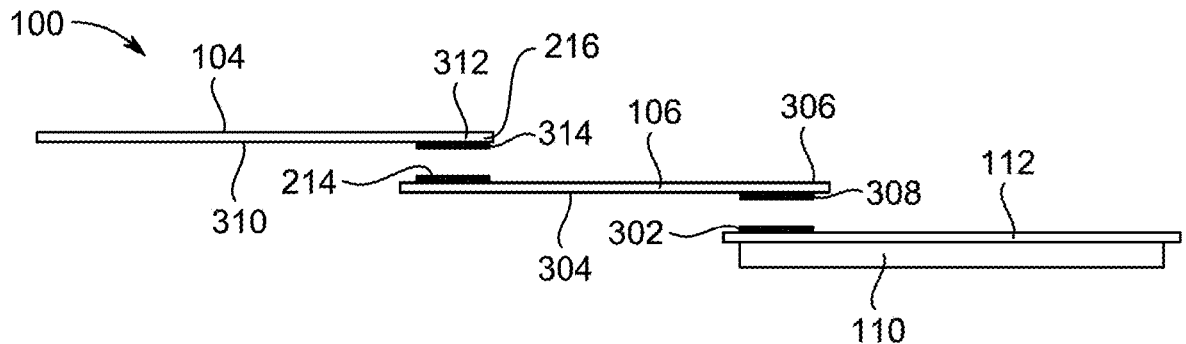

Referring to FIG. 3D, in an embodiment, the rear surface 308 of the lower end 310 of the face shield 104 may include a fourth attachment device 314, in addition to the previously described attachment devices. Such configuration of the device 100 may add to an adhesive bonding between contact attachment devices, thereby securing the respective parts.

Figure 3E:
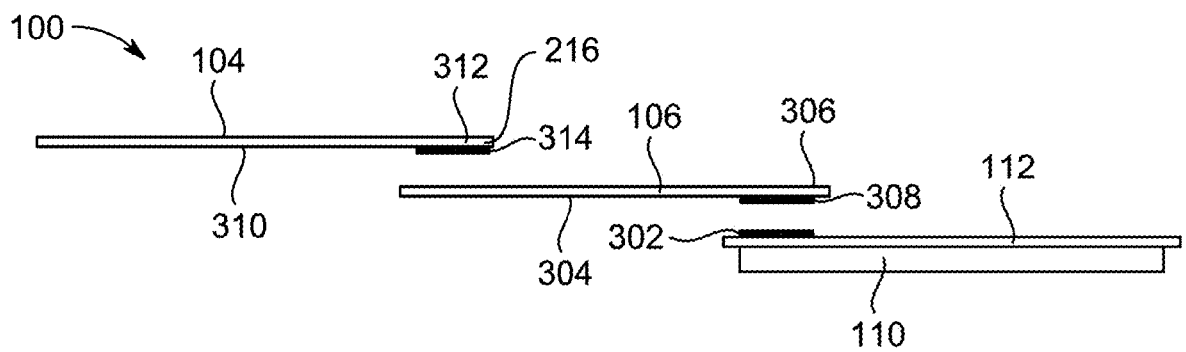

Referring to FIG. 3E, the device 100 may include only the second attachment device 302, the third attachment device 308, and the fourth attachment device 314 and may still achieve the required configuration.

Figure 3F:
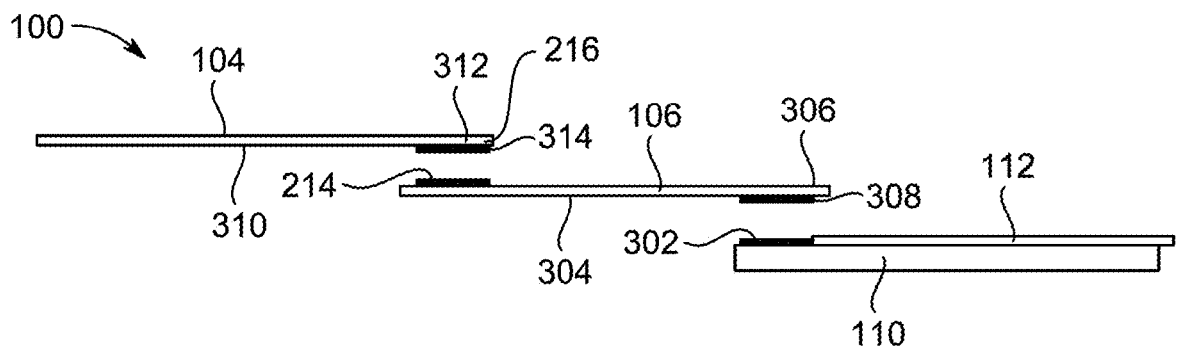

Referring to FIG. 3F, in an embodiment, the portion of the dental dam membrane 112 may be attached to below the upper horizontal member 220 of the dental dam frame 110. In such arrangement, the second attachment device 302 may be provided on the upper horizontal member 220 of the dental dam frame 110 and may be configured to attach with the third attachment device 308 at the rear surface 304 of the lower end 306 of the face mask 106. Additionally, in some embodiments, at least one of the first attachment device 214 and the fourth attachment device 314 may be provided on the face mask 106 and the face shield 106, respectively.

Figure 4:
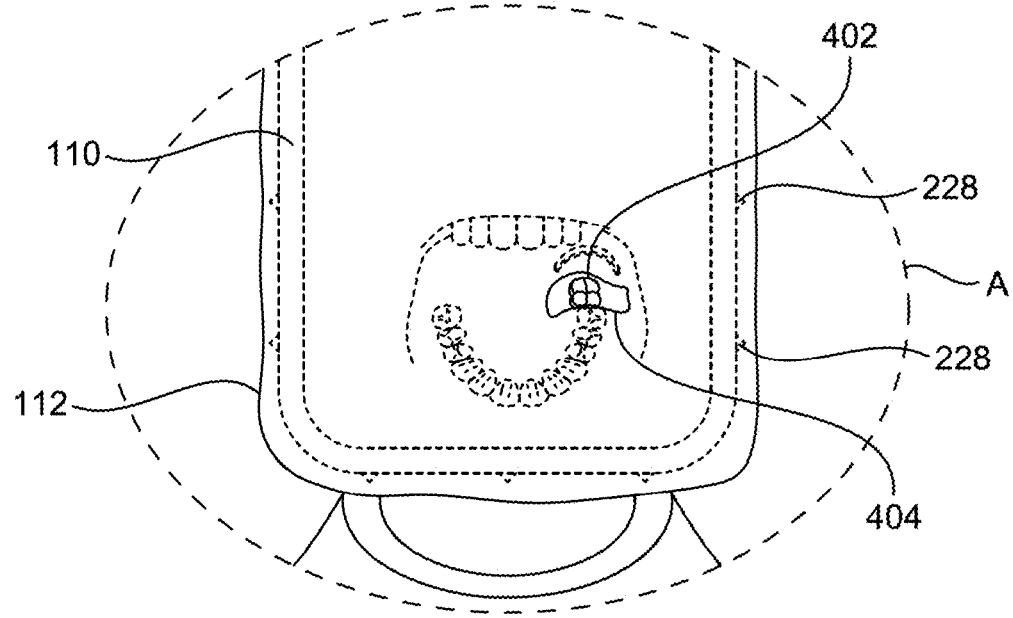
FIG. 4 shows an enlarged view of a portion 'A' in the dental procedure safety device of FIG. 1, according to an embodiment of the present disclosure.

FIG. 4 shows an enlarged view of a portion 'A' of the device 100 in FIG. 1. For the purpose of clarity, the face mask 106 is not shown within the portion 'A'. Since the dental dam membrane 112 is attached to the dental dam frame 110 with the aid of the attachment nibs 228, the dental dam membrane 112 may be removed and replaced at any instance during the treatment of the patient 102. In order to perform a dental treatment on a tooth 402, the operating team may form an opening 404 in the dental dam membrane 112 corresponding to the location of the tooth 402. Since the dental dam membrane 112 is made of flexible material, such as rubber, the opening 404 may be formed with minimum human effort.

Figure 5:
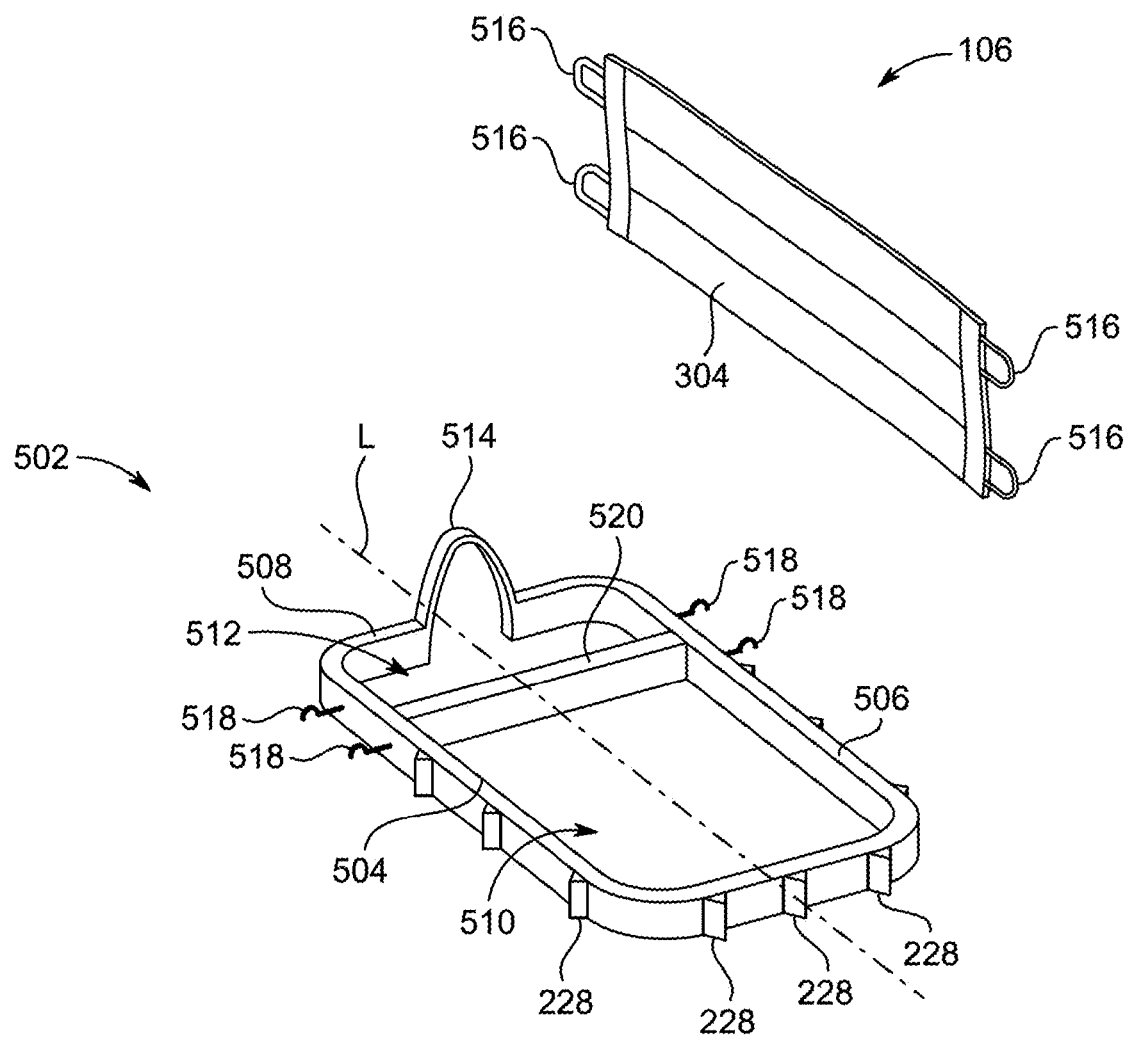
FIG. 5 shows an embodiment of a dental dam frame attachment to a face mask of FIG. 1.

FIG. 5 illustrates a dental dam frame 502 of the device 100, according to another embodiment of the present disclosure. Particularly, FIG. 5 is directed towards providing a means for connecting the face mask 106 to the dental dam frame 502. As such, for the purpose of brevity, only the face mask 106 and the dental dam frame 502 are illustrated. Further, FIG. 5 shows the rear surface 304 of the face mask 106. In an embodiment, a first side leg member 504 and a second side leg member 506 may extend further along a longitudinal axis "L" such that an upper horizontal member 508 rests on the nose of the patient 102. Further, the dental dam frame 502 may be bisected into two portions, such that a first portion 510 forms a lower part of the dental dam frame 502 that is attached with the dental dam membrane 112 (illustrated in FIG. 2) with aid of the attachment nibs 228 and a second portion 512 that forms an upper part of the dental dam frame 502 that has the upper horizontal member 508. In this embodiment, the upper horizontal member 508 may include an impression 514, e.g., a triangular notch, that extends away from the patient 102 nose such that the patient's 102 nose rests at least partially in the impression 514. Further, the impression 514 may include a rubber padding (not shown) on an inner surface thereof that touches the patient's 102 nose to provide comfort to the nose of the patient 102. In an embodiment, the face mask 106 is mechanically attached to the second portion 512 of the dental dam frame 502 by a connecting line 516 (a flexible connecting rod), e.g., a string, extending from the face mask 106 to a connecting point 518, e.g., hooks, disposed on the dental dam frame 502. By way of example, the first side leg member 504 and the second side leg member 506 corresponding to the dental dam frame 502 include hooks or pegs that extend outwards from the dental dam frame 502 on which strings extending from the rear surface 304 of the face mask 106 are connected. In this embodiment, the face mask 106 is attached to the dental dam frame 502 without the use of any adhesive material. In an embodiment, the face mask 106 is attached to the dental dame frame 110 using the adhesive material as well as by connecting lines 516, e.g., strings, extending from the rear surface 304 of the face mask 106 to the extensions (hooks) included on each of the first side leg member 504 and the second side leg member 506 of the dental dam frame 502.

In this embodiment, the dental dam frame 502 is generally rectangular with the first side leg member 504 and the second side leg member 506, of the rectangle placed along the body axis of the patient 102 undergoing treatment. The rectangular dental dam frame 502 has a bisecting horizontal member 520 that is parallel with the top and bottom members of the dental dam frame 502. The bisecting horizontal member 520 is preferably positioned such that a bottom portion (alternatively referred to as "the first portion 510") of the bisected right rectangle is larger than a top portion (alternatively referred to as "the second portion 512"). Preferably the bisecting horizontal member 520 forms a bottom portion of the dental dam frame 502 for framing the oral cavity that represents at least 60% of the total area covered by the members of the dental dam frame 502. The top portion preferably represents a minor portion ranging from 10% to 40%, or 20% to 30% of the total area defined by the members of the dental dam frame 502.

The top portion of the dental dam frame 502 provides a separate frame or support portion for the face mask 106. Preferably, the face mask 106 is in direct contact with the entire length of the upper horizontal member 508 of the dental dam frame 502. In this configuration, the dental dam frame 502 provides a convenient attachment location for the face mask 106. The dental dam frame 502 also provides a means by which the bisecting horizontal member 520 rests on the upper lip or beneath the nose of the patient 102. This process provides further separation of the patient's breathing from the oral cavity.

In an embodiment, the modified face mask shield device 108 is attached to the dental dame frame 110 by tying the strings extending from the rear surface of the face mask 106 to the hooks included on the first side leg member 224 and the second side leg member 226 of the dental dam frame 110. In an embodiment, the modified face mask shield device 108 is attached to the dental dame frame 110 using the adhesive material as well as by tying the strings extending from the rear surface of the face mask 106 to the hooks included on each of the first side leg member 224 and the second side leg member 226 of the dental dam frame 110.

Figure 6A:
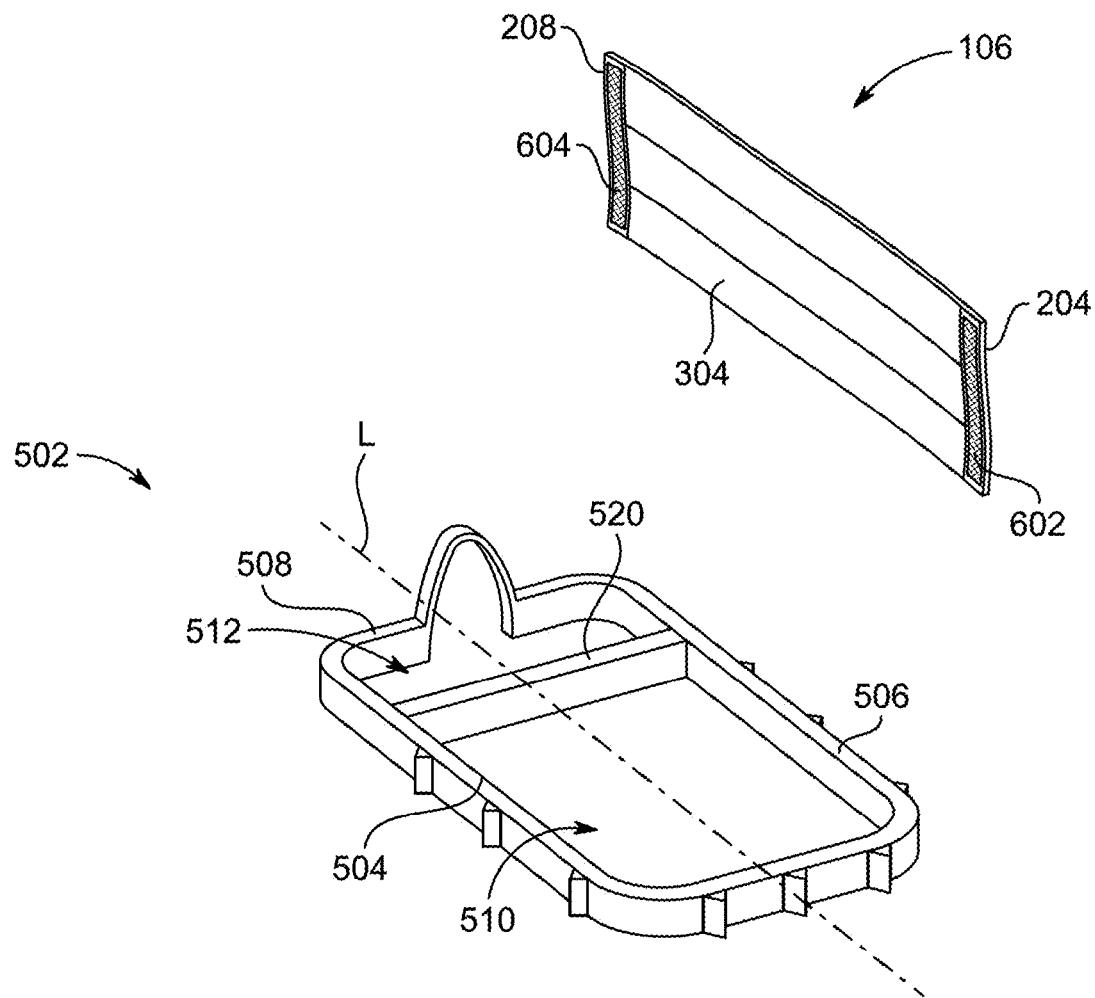
FIGS. 6A, 6B, and 6C shows magnetically attaching the face mask to the dental dam frame.
Figure 6B:
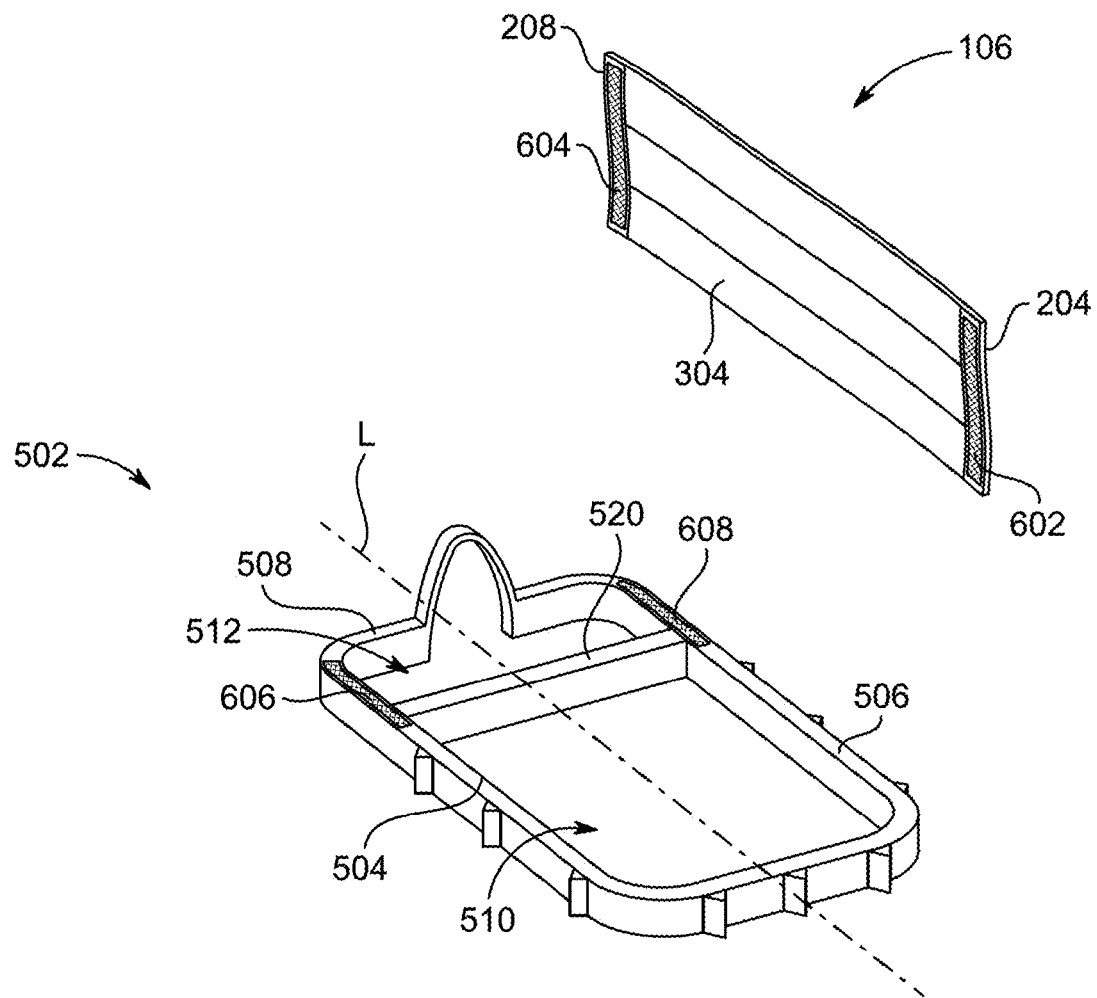
Figure 6C:
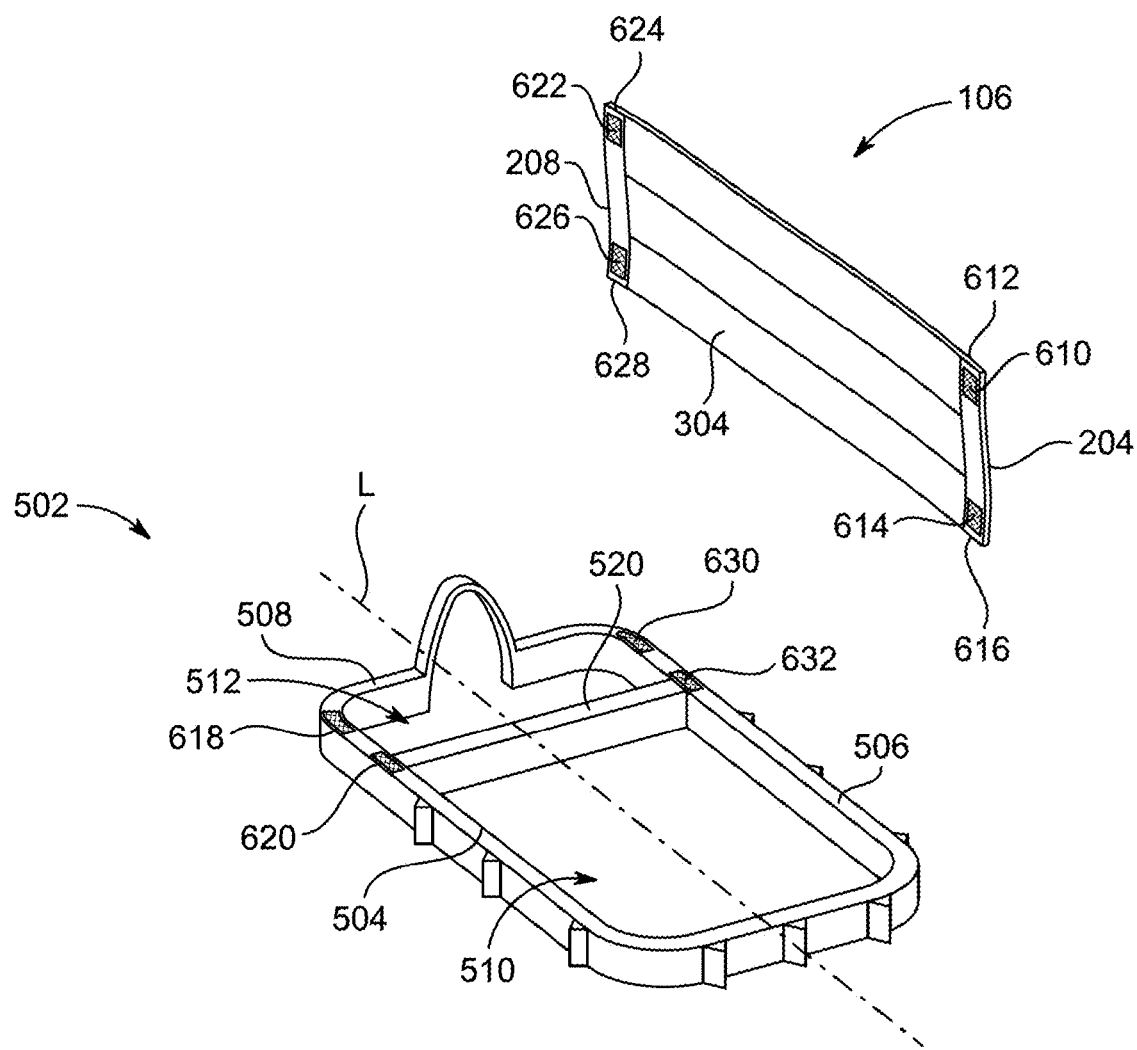

FIGS. 6A, 6B, and 6C illustrates means for magnetically attaching the face mask 106 to the dental dam frame 502. As such, for the purpose of brevity, only the face mask 106 and the dental dam frame 502 are illustrated. Further, FIGS. 6A, 6B, and 6C shows the rear surface 304 of the face mask 106. In an embodiment, the face mask 106 is attached to the second portion 512 of the dental dam frame 502 by magnets. By way of example, a first magnetic strip 602 of a first polarity attached to the first side 204 of the face mask 106 is attracted by magnetic forces to the first side leg member 504 corresponding to the second portion 512 of the dental dam frame 502, such that the first side leg member 504 is made of a magnetic material that has a second polarity opposite to the first polarity of the first magnetic strip 602 attached to the first side 204. Further, a second magnetic strip 604 of a first polarity attached to the second side 208 of the face mask 106 is attracted by magnetic forces to the second side leg member 506 corresponding to the second portion 512 of the dental dam frame 110, such that the second side leg member 506 is also made of a magnetic material that has a second polarity opposite to the first polarity of the second magnetic strip 604 attached to the second side 208. A thickness value of the magnetic strips 602, 604 attached to the first side 204 and the second side 208, respectively, may be in the range of about 0.1 millimeter (mm) to about 0.5 mm and preferably has a thickness value of about 0.25 mm, although any other thickness value may also be included. Further, a length of the magnetic strips attached to the first side 204 and the second side 208 may be in the range of about 1 centimeter (cm) to about 3 cm and preferably has a length of about 2 cm, although any other length may also be included. Accordingly, when the face mask 106 including the magnetic strips 602, 604 forms a part of the modified face mask shield device 108, the modified face mask shield device 108 is attached to the dental dame frame 502 by magnetic forces of the magnetic strips 602, 604 as explained above.

Referring to FIG. 6B, in another embodiment, the first magnetic strip 602 of the first polarity attached to the first side 204 of the face mask 106 is attracted by magnetic forces to another magnetic strip 606 attached on the first side leg member 504 corresponding to the second portion 512 of the dental dam frame 502, such that the magnetic strip 606 attached on the first side leg member 504 is made of a magnetic material that has a second polarity opposite to the first polarity of the first magnetic strip 602 attached to the first side 204. Further, the second magnetic strip 604 of the first polarity attached to the second side 208 of the face mask 106 is attracted by magnetic forces to another magnetic strip 608 attached on the second side leg member 506 corresponding to the second portion 512 of the dental dam frame 502, such that the magnetic strip 608 attached on the second side leg member 506 is made of a magnetic material that has a second polarity opposite to the first polarity of the second magnetic strip 604 attached to the second side 208. A thickness value of the magnetic strips 606, 608 attached to the first side leg member 504 and the second side leg member 506, respectively, may be in the range of about 0.1 millimeter (mm) to about 0.5 mm and preferably has a thickness value of about 0.25 mm, although any other thickness value may also be included. Further, a length of the magnetic strips 606, 608 attached to the first side leg member 504 and the second side leg member 506, respectively, may be in the range of about 1 centimeter (cm) to about 3 cm and preferably has a length of about 2 cm, although any other length may also be included. Accordingly, when the face mask 106 including the magnetic strips 602, 604 forms a part of the modified face mask shield device 108, the modified face mask shield device 108 is attached to the dental dame frame 502 by magnetic forces of the magnetic strips 606, 608 as explained above.

Referring to FIG. 6C, in another embodiment, a first magnetic strip 610 of a first polarity is attached to a first end 612 of the first side 204 of the face mask 106 and a second magnetic strip 614 of the first polarity is attached to a second end 616 of the first side 204 of the face mask 106. Further, a third magnetic strip 618 is attached at the upper side of the first side leg member 504 and a fourth magnetic strip 620 is attached at the lower side of the first side leg member 504 corresponding to the second portion 512 of the dental dam frame 502. The first magnetic strip 610 and the second magnetic strip 614 on the first side 204 of the face mask 106 magnetically attract to the third magnetic strip 618 and the fourth magnetic strip 620 on the first side leg member 504. Additionally, a fifth magnetic strip 622 of a first polarity is attached to a first end 624 of the second side 208 of the face mask 106 and a sixth magnetic strip 626 of the first polarity is attached to a second end 628 of the second side 208 of the face mask 106. Further, a seventh magnetic strip 630 is attached at the upper side of the second side leg member 506 and an eighth magnetic strip 632 is attached at the lower side of the second side leg member 506 corresponding to the second portion 512 of the dental dam frame 502. The fifth magnetic strip 622 and the sixth magnetic strip 626 on the second side 208 of the face mask 106 magnetically attracts to the seventh magnetic strip 630 and the eighth magnetic strip 632 on the second side leg member 506. The length of each of the magnetic strips attached to the first side 204 of the face mask 106, the second side 208 of the face mask 106, the first side leg member 504 of the dental dame frame 502, and the second side leg member 506 of the dental dame frame 502 may be in the range of about 0.5 cm to about 1.5 cm and preferably has a length of about 1 cm, although any other length may also be included. The thickness value of each of the magnetic strips attached to the first side 204 of the face mask 106, the second side 208 of the face mask 106, the first side leg member 504 of the dental dame frame 502 and the second side leg member 506 of the dental dame frame 502 may be in the range of about 0.1 millimeter (mm) to about 0.5 mm and preferably has a thickness value of about 0.25 mm, although any other thickness value may also be included. Accordingly, when the face mask 106 including the magnetic strips 610, 614, 622, 626 forms part of the modified face mask shield device 108, the modified face mask shield device 108 is attached to the dental dame frame 502 by magnetic forces of the magnetic strips as explained above.

Figure 7:
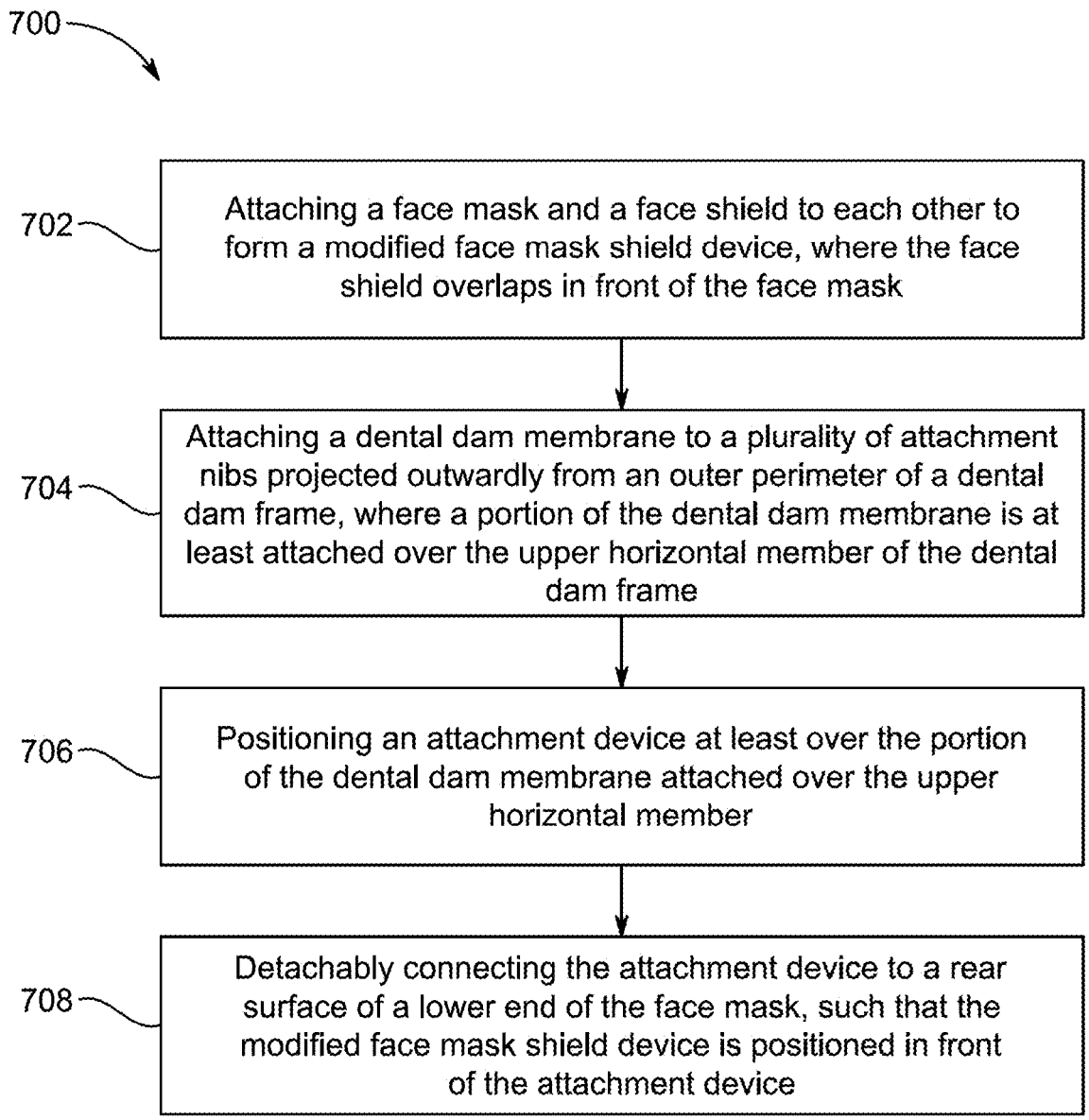
FIG. 7 is a flowchart of a method of manufacturing the dental procedure safety device, according to an embodiment of the present disclosure.

FIG. 7 shows a flowchart of a method 700 of assembling the device 100, according to an embodiment of the present disclosure. The method 700 is described in conjunction with FIG. 1 through FIG. 4. Various steps of the method 700 are included through blocks in FIG. 7. One or more blocks may be combined or eliminated to achieve the device 100 without departing from the scope of the present disclosure.

At step 702, the method 700 includes attaching the face mask 106 and the face shield 104 to each other to form the modified face mask shield device 108, such that the face shield 104 overlaps in front of the face mask 106.

At step 704, the method 700 includes attaching the dental dam membrane 112 to the plurality of attachment nibs 228 projecting outwardly from the outer perimeter 230 of the dental dam frame 110. In an embodiment, the dental dam frame 110 includes the upper horizontal member 220, the lower horizontal member 222, and two vertical side leg members 224, 226 extending between the upper horizontal member 220 and the lower horizontal member 222. In such arrangement, a portion of the dental dam membrane 112 is at least attached over the upper horizontal member 220 of the dental dam frame 110.

At step 706, the method 700 includes positioning the attachment device 302 at least over the portion of the dental dam membrane 112 attached over the upper horizontal member 220.

At step 708, the method 700 includes detachably connecting the attachment device 302 to the rear surface 304 of the lower end 306 of the face mask 106, such that the modified face mask shield device 108 is positioned in front of the attachment device 302.

To this end, the device 100 of the present invention provides maximum shield against any kind of virus or pathogen or bacteria transmission, since it shields the entire face of the patient 102. Therefore, the patient 102 and the operation team may remain safe from any kind of transmission. Further, the parts of the device 100, such as the face shield 104, the face mask 106 and the dental dam member 112, may be easily detached after the treatment procedure and may be disposed. The dental dam frame 110 may be reused after necessary sterilization after each use. It will also be understood by the person skilled in the art that multiple different sized dental dam frames may be used for different patients. For example, the dental dam frame 110 sized to fit an adult male may not be suitable for use on a female or on a child patient, and vice versa. The modified face mask shield device 108 may be made available as one unit and may be packed along with different sized dental dam frames and multiple dental dam membranes, thereby helping the user to achieve the device 100 with minimum human effort.

Obviously, numerous modifications and variations of the present disclosure will be apparent to the person skilled in the art in light of the above description. Position, shape, size and type of the attachment devices described herein are only for the purpose of illustration and should not be considered as limiting. It is therefore to be understood that within the scope of the appended claims, the invention may be practiced otherwise than as specifically described herein.

The invention claimed is:
1. A dental face mask and shield system, comprising:
a face mask made of a soft breathable material,
a face shield in the form of a flexible transparent sheet, wherein the face shield is adapted to cover eyes and a forehead of a patient,
wherein the face mask and the face shield are attachable to each other to form a modified face mask shield device, wherein the face shield overlaps in front of the face mask;
a dental dam frame including an upper horizontal member, a lower horizontal member, and two vertical side leg members;
a plurality of attachment nibs projected outwardly from an outer perimeter of the dental dam frame for attachment of a dental dam membrane, wherein a portion of the dental dam membrane is at least attached over the upper horizontal member of the dental dam frame; and
an attachment device positioned at least over the portion of the dental dam membrane attached over the upper horizontal member, wherein the attachment device is configured to detachably connect to a rear surface of a lower end of the face mask, such that the modified face mask shield device is positioned in front of the attachment device.

2. The dental face mask and shield system of claim 1, wherein the attachment device includes an adhesive device.

3. The dental face mask and shield system of claim 2, wherein the adhesive device is a double-sided tape with an adhesive material positioned on a front surface and a back surface of the adhesive device.

4. The dental face mask and shield system of claim 1, wherein the dental dam membrane includes a rubber dam membrane.

5. The dental face mask and shield system of claim 1, wherein the modified face mask shield device includes a pair of ear loops, wherein the pair of ear loops are positioned on opposite vertical ends of the face mask.

6. The dental face mask and shield system of claim 5, wherein the pair of ear loops are located above the attachment device and the pair of ear loops are configured to avoid interference with the portion of the dental dam membrane attached over the upper horizontal member when the attachment device is detachably connected to the rear surface of the lower end of the face mask.

7. The dental face mask and shield system claim 1, wherein the face mask of the modified face mask shield device is adapted to extend from a middle portion of the patient's nose till an upper border of the patient's lips.

8. The dental face mask and shield system of claim 1, wherein a rear surface of a lower end of the face mask includes another attachment device.

9. The dental face mask and shield system of claim 8, wherein the attachment device is configured to detachably connect to the another attachment device, and the modified face mask shield device is positioned in front of the attachment device.

10. A dental hygiene mask, comprising:
   a face mask made of a soft breathable material,
   a face shield in the form of a flexible transparent sheet, wherein the face shield is adapted to cover eyes and a forehead of a patient,
   wherein the face mask and the face shield attached to each other to form a modified face mask shield device, wherein the face shield overlaps in front of the face mask and a rear surface of a lower end of the face mask includes an attachment device;
   a dental dam frame including an upper horizontal member, a lower horizontal member, and two vertical side leg members;
   a plurality of attachment nibs projected outwardly from an outer perimeter of the dental dam frame for attachment of a dental dam membrane, wherein the dental dam membrane is at least attached over the upper horizontal member; and
   wherein the dental dam membrane attached over the upper horizontal member is configured to detachably connect to the attachment device of the modified face mask shield device.

11. A method of making the face mask and shield system of claim 1, comprising:
   attaching the face mask and the face shield to each other to form the modified face mask shield device, wherein the face shield overlaps in front of the face mask;
   attaching the dental dam membrane to the plurality of attachment nibs projected outwardly from the outer perimeter of the dental dam frame, and wherein a portion of the dental dam membrane is at least attached over the upper horizontal member of the dental dam frame;
   positioning the attachment device at least over the portion of the dental dam membrane attached over the upper horizontal member; and
   detachably connecting the attachment device to the rear surface of the lower end of the face mask, such that the modified face mask shield device is positioned in front of the attachment device.

12. The method of claim 11, wherein the attachment device includes an adhesive device.

13. The method of claim 12, wherein the adhesive device is a double-sided tape with an adhesive material positioned on a front surface and a back surface of the adhesive device.

14. The method of claim 11, wherein the dental dam membrane includes a rubber dam membrane.

15. The method of claim 11, wherein the modified face mask shield device includes a pair of ear loops, wherein the pair of ear loops are positioned on opposite vertical ends of the face mask.

16. The method of claim 15, wherein the pair of ear loops are located above the attachment device and the pair of ear loops are configured to avoid interference with the portion of the dental dam membrane attached over the upper horizontal member when the attachment device is detachably connected to the rear surface of the lower end of the face mask.

* * * * *